United States Patent [19]

Pietras

[11] Patent Number: 4,926,900
[45] Date of Patent: May 22, 1990

[54] VALVE ASSEMBLY AND LOCKING MEANS THEREFOR

[75] Inventor: Eugene E. Pietras, Liverpool, N.Y.

[73] Assignee: Niagara Mohawk Power Corporation, Syracuse, N.Y.

[21] Appl. No.: 352,295

[22] Filed: May 16, 1989

[51] Int. Cl.$^5$ .............................................. F16K 35/00
[52] U.S. Cl. ...................................... 137/385; 251/93; 70/178; 70/179
[58] Field of Search ..................... 137/385; 251/90, 93; 70/176–178, 179

[56] References Cited

U.S. PATENT DOCUMENTS

| 932,437 | 8/1909 | Brady | 137/385 |
| 3,865,130 | 2/1975 | Mullis | 137/385 |
| 3,976,095 | 8/1976 | Koch et al. | 137/385 |
| 4,498,320 | 2/1985 | Mullis | 70/177 |

OTHER PUBLICATIONS

"Ball Valve Locking Device", *Litton*, Nov. 28, 1978.

*Primary Examiner*—A. Michael Chambers
*Attorney, Agent, or Firm*—Lalos & Keegan

[57] ABSTRACT

A valve assembly comprising a valve having a housing and a valve element disposed in the housing and movable between closed and open positions, the valve element having a wing portion provided with an opening therein movable between a first position when the valve element is in the closed position and a second position when the valve element is in the open position, the housing having a wing portion provided with an opening therein disposed in lockable relation with the valve element wing portion when the valve element wing portion is in its first position, a rigid spacer member disposable between the housing and valve element wing portions when the valve element wing portion is in its second position, a barrel lock removably mountable in registered openings of the wing portions when the valve element wing portion is in its first position whereby the valve element will be locked in the closed position, and the rigid spacer member having a hook portion cooperable with the opening in the valve element wing portion and an opening spaced from the hook portion and registrable with the opening in the housing wing portion for removably mounting the barrel lock in the registered openings when the valve element wing portion is in its second position whereby the valve element will be locked in the open position.

36 Claims, 2 Drawing Sheets

VALVE ASSEMBLY AND LOCKING MEANS THEREFOR

This invention relates to an improved valve assembly and more particularly to an improved valve assembly adapted for use in systems for controlling the flow of fluids such as natural gas, oil, water and the like. The invention further contemplates a novel assembly for a valve that is capable of locking the valve in either the open or closed position. In addition, the invention contemplates a novel adapter for a conventional lockwing type of valve that renders the valve capable of being locked in the open position in addition to the closed position.

In systems for distributing fluid such as natural gas, oil, water and the like, there usually is provided plug type valves for controlling the flow of fluid. Such valves typically have open and closed positions. In some applications because of governmental requirements, such type of valve is required to have the capability of being locked in the closed position. As a result of such requirement, there has been developed in the prior art a type of plug valve commonly known as a lockwing plug valve which includes a housing having a valve chamber provided with inlet and outlet ports, and a valve element disposed in the valve chamber provided with a fluid passageway disposable in a first position intercommunicating the inlet and outlet ports to permit the flow of fluid through the valve and in a second position barring communication between the ports to preclude the flow of fluid through the valve. The head portion of the valve element is provided with an operating nut to accommodate a wrench for pivoting the valve seat between the open and closed positions about the turning axis of the valve element, and a locking wing portion which projects laterally or radially relative to the turning axis of the valve seat. The valve element wing portion is provided with an opening adapted to register with an opening in a fixed wing portion of the valve housing when the valve element is in the closed position to allow the application of a barrel-type lock to the two wing portions, with a reduced, intermediate portion of the barrel lock extending through the registered wing openings, thus locking the valve element in the closed position. In natural gas distribution systems of public utilities, literally hundreds of thousands of such types of valves have been installed and are in service.

More recently, certain governmental rules and regulations applicable to the natural gas utility industry have been enacted in several states that require valves installed in gas distribution systems to have the capability of being locked not only in the closed position but also in the open position. Compliance with such new rules and regulations has necessitated either the replacement of all of such valves in a system with valves of a new design or the modification of valves in service to provide the capability of being locked in either the open or closed position.

Responding to the new code requirements, lock manufacturers have developed either new valve designs providing the capability of locking a valve in either the open or closed position or various valve attachments which are designed to preclude access to the operating mechanism of a valve. Included in such new designs is a double lockwing valve which is similar to the aforementioned lockwing valve but is provided with a valve element having a second wing portion displaced 90° from the existing wing portion. In such a valve, by positioning the first valve element wing portion in registry with the housing wing portion, the valve can be locked in the closed position and by positioning the second valve element wing portion in registry with the housing wing portion, the valve may be locked in the open position. Included in the types of attachments that have been developed are a two-piece housing assembly adapted to enclose an entire valve installed in a line and be locked together to prevent unauthorized access to the operating mechanism of the valve, and a cover device adapted to enclose the upper operating mechanism of a valve and be locked to the valve, again to prevent unauthorized access to the operating mechanism of the valve.

With hundreds of thousands of valves installed and in service in a gas distribution system, it has been found to be extremely costly for a gas utility to replace all of the valves in its system or even to provide them with cover attachments barring access to the operating mechanisms of the valves, as have been available in the prior art. It thus has been found to be highly desirable to provide all lockwing valves in service in a gas distribution system with the capability of being locked in either the open or closed position without having to incur the substantial expense of either replacing such valves or providing them with costly cover attachments.

Accordingly, it is the principal object of the present invention to provide an improved valve assembly.

Another object of the present invention is to provide an improved valve assembly adapted to be locked in either the open or closed position.

A further object of the present invention is to provide an improved valve assembly for use in a natural gas, oil or water distribution system that is capable of being locked in either the open or closed position.

A still further object of the present invention is to provide an improved lock assembly for a valve.

Another object of the present invention is to provide an improved lock assembly for a valve capable of locking the valve in either the open or closed position.

A further object of the present invention is to provide an improved lock assembly for a lockwing type of valve that permits the valve to be locked in either the open or closed position.

A still further object of the present invention is to provide a novel adapter suitable for use in a valve assembly normally capable of being locked only in a closed position, providing for rendering the assembly to be locked in either the open or closed position.

Another object of the present invention is to provide an adapter for a lockwing type of valve that will permit the valve to be locked in either the open or closed position.

A still further object of the present invention is to provide a novel adapter for a lockwing type of valve that will render the valve capable of being locked in either the open or closed position which is simple in design, comparatively inexpensive to manufacture, easy to install and effective in performance.

Other objects and advantages of the present invention will become more apparent to those persons having ordinary skill in the art from the following description taken in conjunction with the accompanying drawings wherein.

Figure 1:
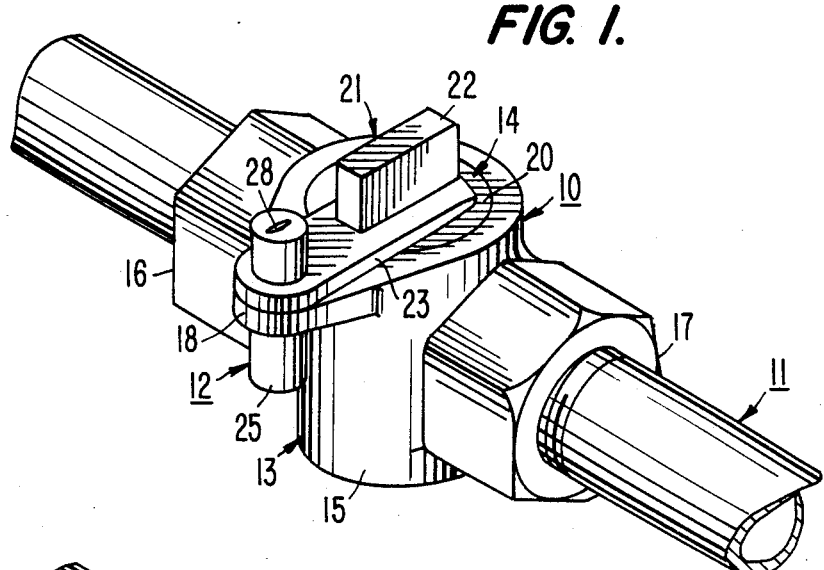
FIG. 1 is a perspective view of a conventional lockwing plug valve installed in a fluid line, illustrated in the locked closed position.
Figure 2:
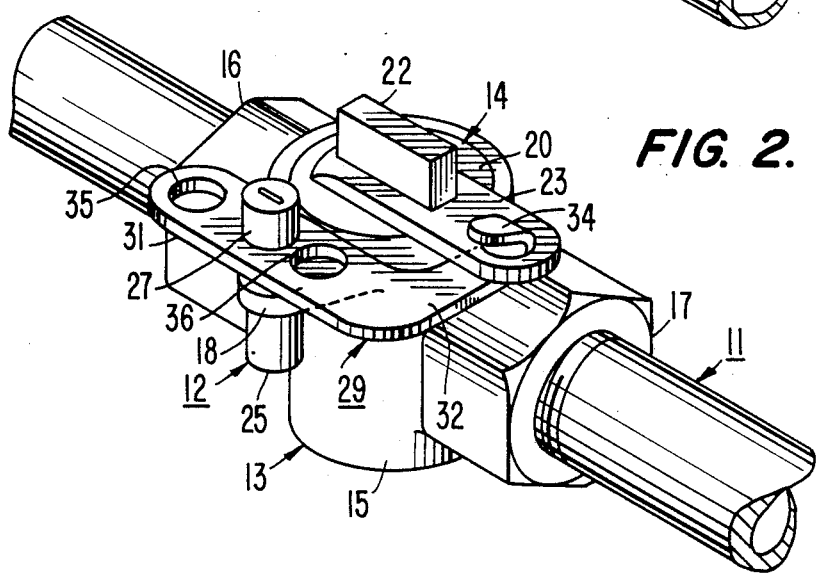
FIG. 2 is a perspective view of a valve assembly similar to the valve assembly shown in FIG. 1, embodying the present invention.
Figure 5:
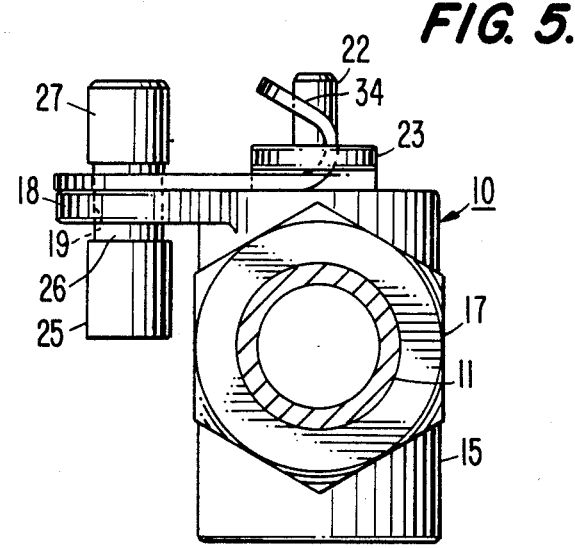
FIG. 5 is an end elevational view of the valve assembly shown in FIGS. 2 through 4.

Referring to FIG. 1 of the drawings, there is illustrated a conventional lock assembly consisting of a lockwing plug valve 10 installed in a fluid line 11 and a barrel lock 12 installed on the valve in the closed position. Valve 10 includes a housing 13 and a valve element 14. Housing 13 includes a main body portion 15 providing a valve chamber and a pair of connecting portions 16 and 17 provided with aligned, threaded ports in which portions of the fluid line are threaded. The housing further is provided with a laterally projecting wing portion 18 provided with a lock receiving opening 19 as best shown in FIG. 5.

Figure 3:
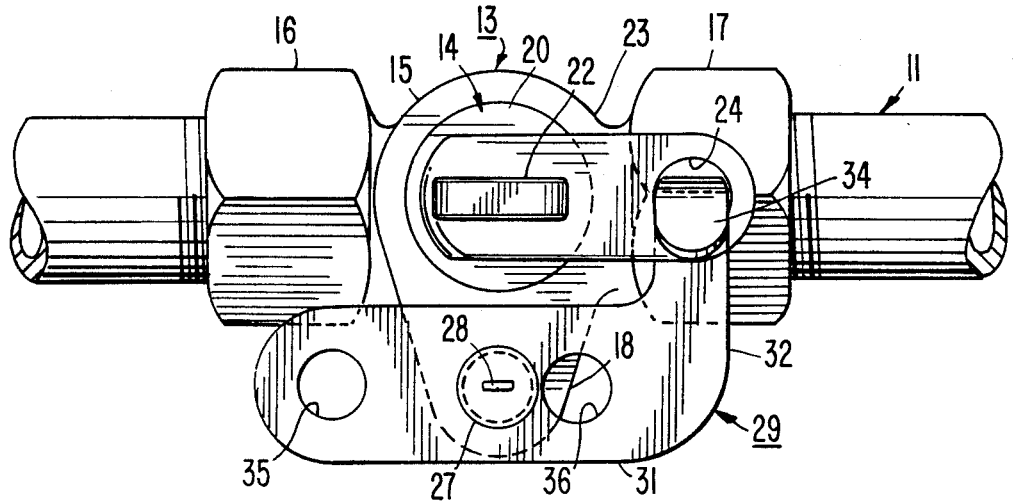
FIG. 3 is a top plan view of the valve assembly shown in FIG. 2.
Figure 4:
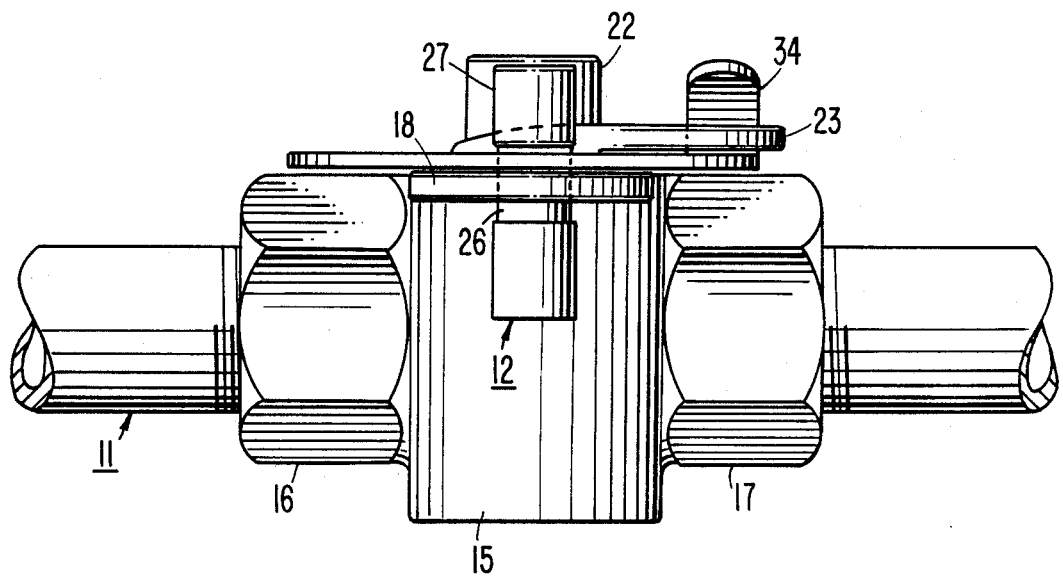
FIG. 4 is a side elevational view of the valve assembly shown in FIGS. 2 and 3.

Valve element 14 includes a main body section 20 disposed within the valve chamber and a head section 21 projecting out of the valve housing and including a nut portion 22 and a laterally projecting wing portion 23. The valve element has a vertically disposed turning axis and a passageway disposed perpendicular to the turning axis which is adapted to register with the ports of the valve chamber when the valve is in the open position. Nut portion 22 is intersected by the turning axis of the valve and has a rectangular cross-sectional configuration so that a tool such as a wrench may be applied for turning the valve element between the open and closed positions. Wing portion 23 projects radially relative to the turning axis of the valve element and is provided with a lock receiving opening 24 as best seen in FIG. 3. When valve element 14 is in the closed position as illustrated in FIG. 1, opening 24 registers with opening 19 of housing wing portion 18 for receiving barrel lock 12 therethrough.

Barrel lock 12 is of a conventional construction including an end section 25 having a diameter larger than either of openings 19 and 24 and an axially projecting portion 26 having a diameter smaller than either of the diameters of openings 19 and 24 and insertable through such openings, and an end section 27 having a diameter greater than the diameters of openings 19 and 24 and an axial opening for receiving reduced portion 26 therein in locking relation. The valve may be locked in the closed position as shown in FIG. 1 by turning the valve element to register wing portion opening 24 with wing portion opening 19, inserting reduced portion 26 of lock section 25 up through the registered openings and applying lock section 27 on the upper end of reduced section 26 so that locking elements on reduced portion 26 and in lock section 27 cooperate to secure the lock sections together. When it is desired to remove the lock as when it may be desired to open the valve, a key may be inserted into a key hole 28 provided in lock section 27 to disengage the locking elements and allow the removal of lock section 27 from reduced portion 26 of lock section 25 and the removal of lock section 25 from the registered openings.

Figure 6:
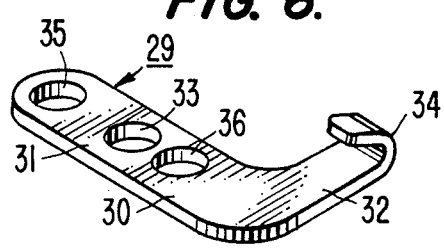
FIG. 6 is a perspective view of the adapter utilized in the valve assembly shown in FIGS. 2 through 5.

The conventional valve assembly as described is adapted to lock the valve only in the closed position as illustrated in FIG. 1. The embodiment of the invention shown in FIGS. 2 through 5, however, allows the assembly shown in FIG. 1 to be locked either in the closed or open positions. Such embodiment includes the valve 10, the barrel lock 12 and an adapter 29 as best illustrated in FIG. 6. The adapter consists of a flat plate member 30 including a first body section 31 and a second body section 32 disposed at an angle relative to first body section 31. The first body section 31 is provided with an opening 33 which is adapted to register with opening 19 of housing wing portion 18 and second body section 32 is provided with an upwardly and inwardly projecting hook portion 34 which is adapted to be received through and be secured to opening 24 of valve element wing portion 23 when valve element 14 is in the open position and opening 33 is registered with opening 19 of housing wing portion 18, as shown in FIGS. 2 through 5. With the various components of the assembly thus positioned, barrel lock 12 may be applied to lock the valve in the open position.

To assure that the valve will be locked in the fully open position as shown in FIGS. 2 through 5, the spacing of hook portion 34 relative to opening 33 is of a dimension corresponding to the dimension of the displacement of the axis of opening 19 of housing wing portion 18 and the vertical axis of opening 24 of valve element wing portion 23 when the valve seat is in the fully open position. The angular displacement of body section 32 relative to body section 31 of the adapter is provided to prevent interference of the adapter with the main body of the valve when the adapter is being applied. To accommodate valves of larger and smaller sizes, additional holes 34 and 35 are provided in body section 31 of the adapter which are disposed at greater and lesser distances from hook portion 34. As an example, opening 33 may be used accommodate a 1" valve, opening 35 may be used to accommodate a 2" valve and opening 36 may be used to accommodate a ¾" valve. In each instance, the angular displacement of adapter body section 32 relative to adapter body section 31 avoids interference of the adapter relative to the valve body to allow and facilitate the application of the adapter.

To change the valve assembly from the locked closed position as shown in FIG. 1 to the locked open position shown in FIG. 2 through 5, lock 12 is first unlocked and removed, and a wrench is applied to nut portion 22 to turn the valve element 90° so that valve element wing portion 23 is positioned as shown in FIGS. 2 through 5. Adapter 29 is then applied by inserting hook portion 34 through opening 24 of valve element wing portion 23, aligning opening 33 of the adapter with opening 19 of housing wing portion 18, inserting reduced portion 26 of lock section 25 up through the lower ends of registered openings 19 and 24 and then mounting lock section 27 on upwardly protruding portion 26 of lock section 25 to snap the lock sections together in locking relation. To change the valve assembly back to the locked closed position, the procedure as described is essentially reversed. The lock is removed, the adapter is then removed, the valve element is turned 90° so that opening 24 of valve element wing portion 23 is again registered with opening 19 of housing wing portion 18 and lock 12 is then reapplied.

Adapter 29 preferably is formed of steel although it may be formed of any other metal or suitably sturdy material adapted not to be compromised by tampering.

It may be formed by stamping it from metal plate, bending an end portion to provide the hook and drilling or otherwise forming the openings for receiving the barrel lock. In lieu of a hook portion for connecting the adapter to the valve element wing portion, any other form of connecting means can be used. Furthermore, any form of lock can be used including a padlock. The arrangement as shown in the drawings also can be reversed with a hook or other connecting means of the adapter cooperating with the housing wing portion and a lock cooperating with the adapter and the valve element wing portion. As an example, adapter body portion 31 may be provided with a hook portion cooperating with opening 19 of housing wing portion 18, and body section 32 of the adapter may be provided with an opening registrable with opening 24 of the valve element wing portion when the valve is in the open position for receiving a restraining element of a locking device such as a padlock. The configuration of the adapter also may be varied, the critical aspects of the adapter being the displacement between the securing means to assure the locking of the valve in the open position, and the avoidance of interference with the valve body in order to accommodate the application of the adapter.

It is a further important feature of the present invention to provide the adapter with multiple securing means such as openings 33, 35 and 36 which allow the adapter to be used with valves of different sizes. Again, the only critical features are that the distances between each of the securing means on one section of the adapter and the securing means on the other section of the adapter correspond to the various dimensions of valves of different sizes. Although adapter section 31 is disposed parallel to valve element wing portion 23 in the embodiment shown in the drawings when opening 33 in the adapter registers with opening 19 in the housing wing portion, adapter section 31 will be disposed at an angle relative to the valve element wing portion when opening 36 registers with opening 19 to accommodate a smaller valve than the valve shown in the drawings and when opening 35 registers with opening 19 to accommodate a valve larger than the valve shown in the drawings.

It will be appreciated that with an adapter of the type as illustrated and described, valves of the type shown in FIG. 1 presently in service and of a variety of sizes ranging from ½" up to 2" can readily be transformed into valves that may be locked in either the open or closed position to comply with applicable federal and state code requirements. Such adapter allows the transformation of such valve installations without incurring the cost of either replacing such valves with valves designed to be locked in the open or closed position or providing existing valves with various enclosure devices preventing access to the operating mechanisms of such valves.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A valve assembly comprising:

a valve having a housing provided with inlet and outlet ports and a valve element disposed in said housing and movable between closed and open positions, said valve element having a wing portion provided with an opening therein movable between a first position when said valve element is in the closed position and a second position when said valve element is in the open position, said housing having a wing portion provided with an opening therein disposed in lockable relation with said valve element wing portion when said valve element is in said first position;

a rigid spacer member disposable between said housing and valve element wing portions when said valve element is in the open position and said valve element wing portion is in said second position;

a barrel lock removably mountable in registered openings of said wing portions when said valve element wing portion is in said first position and said valve element is in the closed position whereby said valve element will be locked in the closed position; and said rigid spacer member having a hook portion cooperable with the opening in said valve element wing portion, and an opening spaced from said hook portion and registrable with the opening in said housing wing portion for removably mounting said barrel lock in said registered openings when said valve element wing portion is in the second position and said valve element is in the open position whereby said valve element will be locked in the open position.

2. A valve assembly according to claim 1 wherein said rigid spacer member is provided with a plurality of openings each selectively registrable with the opening in said housing wing portion and cooperable with said barrel lock, each disposed at a different distance from said hook portion for accommodating valves of different sizes.

3. An adapter for a valve assembly including a valve having a housing and a valve element disposed in said housing and movable between closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position, and detachable means for locking said valve element and housing securing portions together when said portions are disposed in lockable relation, comprising:

a rigid spacer member disposable between said housing and valve element securing portions when said valve element is in the open position and said valve element securing portion is in said second position;

said rigid spacer member having first means cooperable with one of said housing and valve element securing means for securing said rigid spacer member to said one of said housing and valve element securing portions, and second securing means spaced from said first securing means cooperable with said other of said housing and valve element securing portions and said locking means for locking said rigid spacer member between said housing and valve element securing portions when said valve element securing portion is in said second position and said valve element is in the open position whereby said valve element will be locked in the open position; and said first securing means cooperable with said one of said housing and valve element securing portions comprising a hook portion of said rigid spacer member cooperable with an opening in said one of said housing and valve element securing portions.

4. An adapter according to claim 3 wherein said rigid spacer member is provided with a plurality of securing means each selectively cooperable with said other of said housing and valve element securing portions, each disposed at a different distance from said first securing means for accommodating valves of different sizes.

5. An adapter for a valve assembly including a valve having a housing and a valve element disposed in said housing and movable between closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position, and detachable means for locking said valve element and housing securing portions together when said portions are disposed in lockable relation, comprising:

a rigid spacer member disposable between said housing and valve element securing portions when said valve element is in the open position and said valve element securing portion is in said second position;

said rigid spacer member having first means cooperable with one of said housing and valve element securing means for securing said rigid spacer member to said one of said housing and valve element securing portions, and second securing means spaced from said first securing means cooperable with said other of said housing and valve element securing portions and said locking means for locking said rigid spacer member between said housing and valve element securing portions when said valve element securing portion is in said second position and said valve element is in the open position whereby said valve element will be locked in the open position; and said rigid spacer member comprising a plate member having a first body section provided with a hook portion therein comprising said first securing means and a second body section provided with an opening comprising said second securing means.

6. An adapter according to claim 5 wherein said rigid spacer member is provided with a plurality of securing means each selectively cooperable with said other of said housing and valve element securing portions, each disposed at a different distance from said first securing means for accommodating valves of different sizes and said second body section of said plate member is disposed at an angle relative to said first body section and has a plurality of openings comprising said plurality of securing means.

7. A lock assembly for a valve having a housing and a valve element disposed in said housing and movable between closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position, comprising:

a rigid spacer member disposable between said housing and valve element securing portions when said valve element is in the open position and said valve element securing portion is in said second position;

detachable means for locking said housing and valve element portions together when said valve element securing means is in said first position and said valve element is in the closed position whereby said valve element will be locked in the closed position;

said rigid spacer member having a first means cooperable with one of said housing and valve element securing means for securing said rigid spacer member to said one of said housing and valve element securing portions, and second securing means spaced from said first securing means and cooperable with said other of said housing and valve element securing portions and said locking means for locking said rigid spacer member between said housing and valve element securing portions when said valve element securing portion is in said second position and said valve element is in the open position whereby said valve element will be locked in the open position; and said securing means cooperable with said one of said housing and valve element securing portions comprising a hook portion of said rigid spacer member cooperable with an opening in said one of said housing and valve element securing portions.

8. A lock assembly for a valve having a housing and a valve element disposed in said housing and movable between closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position, comprising:

a rigid spacer member disposable between said housing and valve element securing portions when said valve element is in the open position and said valve element securing portion is in said second position;

detachable means for locking said housing and valve element portions together when said valve element securing means is in said first position and said valve element is in the closed position whereby said valve element will be locked in the closed position;

said rigid spacer member having a first means cooperable with one of said housing and valve element securing means for securing said rigid spacer ember to said one of said housing and valve element securing portions, and second securing means spaced from said first securing means and cooperable with said other of said housing and valve element securing portions and said locking means for locking said rigid spacer member between said housing and valve element securing portions when said valve element securing portion is in said second position and said valve element is in the open position whereby said valve element will be locked in the open position; and said rigid spacer member comprising a plate member having a first body section provided with a hook portion comprising said first securing means and a second body section provided with an opening comprising said second securing means.

9. A lock assembly according to claim 8 wherein said locking means comprises a barrel lock.

10. A lock assembly for a valve having a housing and a valve element disposed in said housing and movable between closed and open positions, said valve element having a securing portion movable between a first position when said valve element is in the closed position and a second position when said valve element is in the open position, said housing having a securing portion disposed in lockable relation with said valve element securing portion when said valve element securing portion is in said first position, comprising:
  a rigid spacer member disposable between said housing and valve element securing portions when said valve element is in the open position and said valve element securing portion is in said second position;
  detachable means for locking said housing and valve element portions together when said valve element securing means is in said first position and said valve element is in the closed position whereby said valve element will be locked in the closed position;
  said rigid spacer member having a first means cooperable with one of said housing and valve element securing means for securing said rigid spacer member to said one of said housing and valve element securing portions, and second securing means spaced from said first securing means and cooperable with each other of said housing and valve element securing portions and said locking means for locking said rigid spacer member between said housing and valve element securing portions when said valve element securing portion is in said second position and said valve element is in the open position whereby said valve element will be locked in the open position;
  said rigid spacer member being provided with a plurality of securing means each selectively cooperable with said other of said housing and valve element securing portions, each disposed at a different distance from said first securing means for accommodating valves of different sizes; and
  said first securing means comprising a hook portion of said rigid spacer member cooperable with an opening in said one of said housing and valve element securing portions.

11. A valve assembly comprising:
  a valve having a housing provided with inlet and outlet ports and a valve element disposed in said housing and movable between closed and open positions, said valve element having a securing portion movable between a first position when said valve element is in the closed position and a second position when said valve element is in the open position, said housing having a securing portion disposed in lockable relation with said valve element securing portion when said valve element securing means is in said first position;
  a rigid spacer member disposable between said housing and valve element securing portions when said valve element is in the open position and said valve element securing portion is in said second position;
  detachable means for locking said housing and valve element portions together when said valve element securing means is in said first position and said valve element is in the closed position whereby said valve element will be locked in the closed position;
  said rigid spacer member having a first means cooperable with one of said housing and valve element securing means for securing said rigid spacer member to said one of said housing and valve element securing portions, and second securing means spaced from said first securing means and cooperable with said other of said housing and valve element securing portions and said locking means for locking said rigid spacer member between said housing and valve element securing portions when said valve element securing portion is in said second position and said valve element is in the open position whereby said valve element will be locked in the open position; and
  said securing means cooperable with said one of said housing and valve element securing portions comprising a hook portion of said rigid spacer member cooperable with an opening in said one of said housing and valve element securing portions.

12. A valve assembly comprising:
  a valve having a housing provided with inlet and outlet ports and a valve element disposed in said housing and movable between closed and open positions, said valve element having a securing portion movable between a first position when said valve element is in the closed position and a second position when said valve element is in the open position, said housing having a securing portion disposed in lockable relation with said valve element securing portion when said valve element securing means is in said first position;
  a rigid spacer member disposable between said housing and valve element securing portions when said valve element is in the open position and said valve element securing portion is in said second position;
  detachable means for locking said housing and valve element portions together when said valve element securing means is in said first position and said valve element is in the closed position whereby said valve element will be locked in the closed position;
  said rigid spacer member having a first means cooperable with one of said housing and valve element securing means for securing said rigid spacer member to said one of said housing and valve element securing portions, and second securing means spaced from said first securing means and cooperable with said other of said housing and valve element securing portions and said locking means for locking said rigid spacer member between said housing and valve element securing portions when said valve element securing portion is in said second position and said valve element is in the open position whereby said valve element will be locked in the open position; and
  said rigid spacer member comprising a plate member having a first body section provided with a hook portion comprising said first securing means and a second body section provided with an opening comprising said second securing means.

13. A valve assembly according to claim 12 wherein said locking means comprises a barrel lock.

14. A valve assembly according to claim 11 wherein said rigid spacer member is provided with a plurality of securing means each selectively cooperable with said other of said housing and valve element securing portions, each disposed at a different distance from said first securing means for accommodating valves of different sizes.

15. A valve assembly according to claim 12 wherein said rigid spacer member is provided with a plurality of securing means each selectively cooperable with said other of said housing and valve element securing portions, each disposed at a different distance from said first securing means for accommodating valves of different sizes and said second body section of said plate member is disposed at an angle relative to said first body section and has a plurality of openings comprising said second securing means.

16. An adapter for a valve assembly including a valve having a housing and a valve element disposed in said housing and movable between closed and open positions, said valve element having an integral securing portion movable between a first position when said valve element is in the closed position and a second position when said valve element is in the open position, said housing having an integral securing portion disposed in lockable relation with said valve element securing portion when said valve element securing portion is in said first position, and detachable means for locking said valve element and housing securing portions together when said portions are disposed in lockable relation, whereby said valve assembly can be locked in the closed position only, comprising:
a rigid spacer member disposable between said housing and valve element securing portions when said valve element is in the open position and said valve element securing portion is in said second position; and
said rigid spacer member having first means cooperable with one of said housing and valve element securing means for securing said rigid spacer member to said one of said housing and valve element securing portions, and second securing means spaced from said first securing means cooperable with said other of said housing and valve element securing portions and said locking means for locking said rigid spacer member between said housing and valve element securing portions when said valve element securing portion is in said second position and said valve element is in the open position whereby said valve element will be locked in the open position.

17. An adapter according to claim 16 wherein said rigid spacer member is provided with a plurality of securing means each selectively cooperable with said other of said housing and valve element securing portions, each disposed at a different distance from said first securing means for accommodating valves of different sizes.

18. An adapter according to claim 17 wherein said rigid spacer member includes a first body section including said first securing means and a second body section disposed at an angle relative to said first body section and including said plurality of securing means.

19. An adapter according to claim 16 wherein said second securing means comprises an opening in said rigid spacer member registrable with an opening in said other of said housing and valve element securing means for receiving a restraining element of said locking means therethrough.

20. An adapter according to claim 16 wherein said rigid spacer member includes a first body section including said first securing means and a second body section disposed at an angle relative to said first body section and including said second securing means.

21. An adapter according to claim 17 wherein said plurality of means each selectively cooperable with said other of said housing and valve element securing portions comprise a plurality of openings each selectively registrable with an opening comprising said other of said housing and valve element securing portions for receiving a restraining element of said locking means therethrough.

22. A lock assembly for a valve having a housing and a valve element disposed in said housing and movable between closed and open positions, said valve element having an integral securing portion movable between a first position when said valve element is in the closed position and a second position when said valve element is in the open position, said housing having an integral securing portion disposed in lockable relation with said valve element securing portion when said valve element securing portion is in said first position whereby said valve assembly can be locked in the closed position only, comprising:
a rigid spacer member disposable between said housing and valve element securing portions when said valve element is in the open position and said valve element securing portions is in said second position;
detachable means for locking said housing and valve element portions together when said valve element securing means is in said first position and said valve element is in the closed position whereby said valve element will be locked in the closed position; and
said rigid spacer member having a first means cooperable with one of said housing and valve element securing means for securing said rigid spacer member to said one of said housing and valve element securing portions, and second securing means spaced from said first securing means and cooperable with said other of said housing and valve element securing portions and said locking means for locking said rigid spacer member between said housing and valve element securing portions when said valve element securing portion is in said second position and said valve element is in the open position whereby said valve element will be locked in the open position.

23. A lock assembly according to claim 22 wherein said rigid spacer member is provided with a plurality of securing means each selectively cooperable with said other of said housing and valve element securing portions, each disposed at a different distance from said first securing means for accommodating valves of different sizes.

24. A lock assembly according to claim 23 wherein said plurality of means cooperable with said other of said housing and valve element securing portions comprises a plurality of openings each selectively registrable with an opening comprising said other of said housing and valve element securing portions for receiving a restraining element of said locking means therethrough.

25. A lock assembly according to claim 24 wherein said locking means comprises a barrel lock.

26. A lock assembly according to claim 23 wherein said rigid spacer member comprises a plate member including a first body section having a hook portion comprising said first securing means and a second body section disposed at an angle relative to said first body section having a plurality of openings comprising said second securing means.

27. A lock assembly according to claim 22 wherein said second securing means comprises an opening in said rigid spacer member registrable with an opening in said other of said housing and valve element securing means for receiving a restraining element of said locking means therethrough.

28. A lock assembly according to claim 27 wherein said locking means comprises a barrel lock.

29. A lock assembly according to claim 22 wherein said rigid spacer member includes a first body section including said first securing means and a second body portion disposed at an angle relative to said first body section and including said second securing means.

30. A valve assembly comprising:
a valve having a housing provided with inlet and outlet ports and a valve element disposed in said housing and movable between closed and open positions, said valve element having an integral securing portion movable between a first position when said valve element is in the closed position and a second position when said valve element is in the open position, said housing having an integral securing portion disposed in lockable relation with said valve element securing portion when said valve element securing means is in said first position whereby the valve can be locked in the closed position only;
a rigid spacer member disposable between said housing and valve element securing portions when said valve element is in the open position and said valve element securing portion is in said second position;
detachable means for locking said housing and valve element portions together when said valve element securing means is in said first position and said valve element is in the closed position whereby said valve element will be locked in the closed position; and
said rigid spacer member having a first means cooperable with one of said housing and valve element securing means for securing said rigid spacer member to said one of said housing and valve element securing portions, and second securing means spaced from said first securing means and cooperable with said other of said housing and valve element securing portions and said locking means for locking said rigid spacer member between said housing and valve element securing portions when said valve element securing portion is in said second position and said valve element is in the open position whereby said valve element will be locked in the open position.

31. A valve assembly according to claim 30 wherein said rigid spacer member is provided with a plurality of securing means each selectively cooperable with said other of said housing and valve element securing portions, each disposed at a different distance from said first securing means for accommodating valves of different sizes.

32. A valve assembly according to claim 31 wherein said plurality of means cooperable with said other of said housing and valve element securing portions comprise a plurality of openings each selectively registrable with an opening comprising said other of said housing and valve element securing portions for receiving a restraining element of said locking means therethrough.

33. A valve assembly according to claim 31 wherein said locking means comprises a barrel lock.

34. A valve assembly according to claim 30 wherein said second securing means comprises an opening in said rigid spacer member registrable with an opening in said other of said housing and valve element securing means for receiving a restraining element of said locking means therethrough.

35. A valve assembly according to claim 34 wherein said locking means comprises a barrel lock.

36. A valve assembly according to claim 30 wherein said rigid spacer member includes a first body section including said first securing means and a second body section disposed at an angle relative to said first body section and including said second securing means.

* * * * *